United States Patent
Kinomura

(10) Patent No.: US 10,363,827 B2
(45) Date of Patent: *Jul. 30, 2019

(54) VEHICLE

(71) Applicant: Toyota Jidosha Kabushiki Kaisha, Toyota-shi, Aichi-ken (JP)

(72) Inventor: Shigeki Kinomura, Toyota (JP)

(73) Assignee: Toyota Jidosha Kabushiki Kaisha, Toyota-shi Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/146,711

(22) Filed: Sep. 28, 2018

(65) Prior Publication Data

US 2019/0031040 A1 Jan. 31, 2019

Related U.S. Application Data

(63) Continuation of application No. 15/723,470, filed on Oct. 3, 2017, now Pat. No. 10,124,692.

(30) Foreign Application Priority Data

Oct. 26, 2016 (JP) ................................ 2016-209475

(51) Int. Cl.
  *B60L 53/14* (2019.01)
  *B60L 11/18* (2006.01)
  (Continued)

(52) U.S. Cl.
  CPC ......... *B60L 11/1848* (2013.01); *B60L 3/0046* (2013.01); *B60L 11/1874* (2013.01); *B60L 53/14* (2019.02); *B60L 53/31* (2019.02); *B60L 53/64* (2019.02); *B60L 53/665* (2019.02); *B60L 58/26* (2019.02); *G07B 15/063* (2013.01); *B60L 2240/545* (2013.01); *B60L 2240/80* (2013.01); *Y02T 10/7005* (2013.01); *Y02T 10/705* (2013.01); *Y02T 10/7072* (2013.01);
  (Continued)

(58) Field of Classification Search
  CPC .. B60L 11/184; B60L 11/1848; B60L 11/185; G06Q 30/0283; G06Q 30/0284
  See application file for complete search history.

(56) References Cited

U.S. PATENT DOCUMENTS

2010/0049737 A1* 2/2010 Ambrosio ........... B60L 11/1824
                                                      705/412
2011/0224900 A1* 9/2011 Hiruta ................ G01C 21/3469
                                                      701/533

(Continued)

FOREIGN PATENT DOCUMENTS

JP         2014-078249 A        5/2014

*Primary Examiner* — Laura N Nguyen
(74) *Attorney, Agent, or Firm* — Dinsmore & Shohl LLP

(57) ABSTRACT

A vehicle includes an electrical storage device, a notifier, a communication device, and an electronic control unit. The electronic control unit predicts the amount of charging power of the electrical storage device and the use time in a case where external charging is performed, in accordance with the state of the electrical storage device. The electronic control unit predicts cost performance of the external charging in accordance with the amount of charging power and the use time that are predicted, and information relating to a fee-charging system. The electronic control unit controls the notifier so as to execute the notification of the cost performance.

2 Claims, 14 Drawing Sheets

(51) Int. Cl.
  *G07B 15/06* (2011.01)
  *B60L 3/00* (2019.01)
  *B60L 53/31* (2019.01)
  *B60L 53/64* (2019.01)
  *B60L 53/66* (2019.01)
  *B60L 58/26* (2019.01)

(52) U.S. Cl.
  CPC ............ *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 2012/0239594 A1* | 9/2012 | Boot | B60L 11/184 |
| | | | 705/412 |
| 2013/0041531 A1* | 2/2013 | LaFrance | B60L 11/1846 |
| | | | 701/22 |
| 2013/0346166 A1* | 12/2013 | Chihara | G07B 15/02 |
| | | | 705/13 |
| 2013/0346308 A1* | 12/2013 | Naito | H01M 10/44 |
| | | | 705/41 |
| 2017/0008414 A1* | 1/2017 | Han | B60L 11/1848 |
| 2018/0001779 A1* | 1/2018 | Kothavale | H02J 7/0027 |

* cited by examiner

VEHICLE

CROSS-REFERENCE TO RELATED APPLICATIONS

This application is a continuation application of U.S. patent application Ser. No. 15/723,470 filed Oct. 3, 2017, which claims priority to Japanese Patent Application No. 2016-209475 filed on Oct. 26, 2016, the entire contents of which are incorporated herein by reference.

BACKGROUND

1. Technical Field

The disclosure relates to a vehicle, and particularly relates to a vehicle configured to perform charging of an in-vehicle electrical storage device using power supplied from a charging stand provided outside of a vehicle (hereinafter, also called "external charging").

2. Description of Related Art

Japanese Unexamined Patent Application Publication No. 2014-78249 (JP 2014-78249 A) discloses a charging facility for charging an in-vehicle electrical storage device. The charging facility is provided at a public coin-parking lot. A user of the coin-parking lot pays both a charging fee and a parking fee during settlement. In the coin-parking lot, a fee-charging system is adopted in which the charging fee is charged in accordance with the amount of charging power, and the parking fee is charged in accordance with the parking time (see JP 2014-78249 A).

SUMMARY

In addition to the fee-charging system disclosed in JP 2014-78249 A, it is also considered to adopt, for example, a fee-charging system (hereinafter, a "time-based fee-charging system" is also called) in which a charging fee is charged based on the use time of a charging stand (charging facility) (hereinafter, the "stand use time" is also called).

Even in a case where the amounts of charging power are the same as each other, a charging fee increases as the stand use time becomes longer, in a charging stand having a time-based fee-charging system adopted therein. The stand use time in external charging may fluctuate depending on, for example, the state (such as temperature) of an electrical storage device. Therefore, there is the possibility of the charging fee fluctuating depending on the state of the electrical storage device. In a case where the charging fee is more expensive than a user's estimate, the user is likely to feel inclined to withhold the external charging.

The disclosure provides a vehicle that makes it possible for a user to appropriately determine whether or not to perform external charging.

An aspect of the disclosure relates to a vehicle configured to receive a supply of power from a charging stand provided outside of the vehicle. The charging stand is configured to perform fee-charging on the supply of power to the vehicle in accordance with a fee-charging system based on the use time of the charging stand. The vehicle includes an electrical storage device configured to perform external charging using the power supplied from the charging stand, a notifier configured to execute a notification to a user, a communication device configured to acquire information relating to the fee-charging system of the charging stand, and an electronic control unit. The electronic control unit predicts the amount of charging power of the electrical storage device and the use time in a case where the external charging is performed, in accordance with the state of the electrical storage device. The electronic control unit predicts cost performance of the external charging in accordance with the amount of charging power and the use time that are predicted, and the information relating to the fee-charging system. The electronic control unit controls the notifier so as to execute the notification of the cost performance. The cost performance refers to the performance, charge amount of the electric power, divided by the cost. Thus, larger cost performance refers a low price charging.

According to the aspect of the disclosure, since the notification to a user is executed in a case where the cost performance of the external charging is less than the first predetermined value, the user can prevent the external charging from being executed in a case where the cost performance of the external charging is low. Meanwhile, the cost performance of the external charging refers to the amount of charging power per unit fee-charging in the external charging.

The vehicle according to the aspect may further include an input device. The input device may be configured to receive input from the user. The notifier may be configured to urge the user to select whether or not to execute the external charging through the input device.

According to the aspect of the disclosure, in a case where the cost performance of the external charging is less than the first predetermined value, the selection of whether or not to execute external charging is urged. Therefore, the user can select whether or not to perform the external charging in a case where the cost performance is low, through the input device.

The vehicle according to the aspect may further include a charger. The charger may be configured to charge the electrical storage device. The electronic control unit may be configured to control the charger so as to charge the electrical storage device in a case where the cost performance is equal to or greater than a second predetermined value smaller than the first predetermined value. On the other hand, the electronic control unit may be configured to control the charger so as not to charge the electrical storage device in a case where the cost performance is less than the second predetermined value.

According to the aspect of the disclosure, it is automatically selected whether or not to execute the external charging in a case where the cost performance of the external charging is less than the second predetermined value. Therefore, with the vehicle, the user can reduce time and effort to select whether or not to execute the external charging.

In the vehicle according to the aspect, the electronic control unit may be configured to predict the amount of charging power of the electrical storage device, based on the state of charge of the electrical storage device.

In the vehicle according to the aspect, the communication device may be configured to acquire information relating to power fed per unit time from the charging stand. The electronic control unit may be configured to predict the use time based on the amount of charging power and the information relating to power fed per unit time.

In the vehicle according to the aspect, the electronic control unit may be configured to predict the use time based on the temperature of the electrical storage device.

In the vehicle according to the aspect, the electronic control unit may be configured such that the user sets the first predetermined value.

According to the disclosure, it is possible to provide a vehicle that makes it possible for a user to appropriately determine whether or not to perform external charging.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
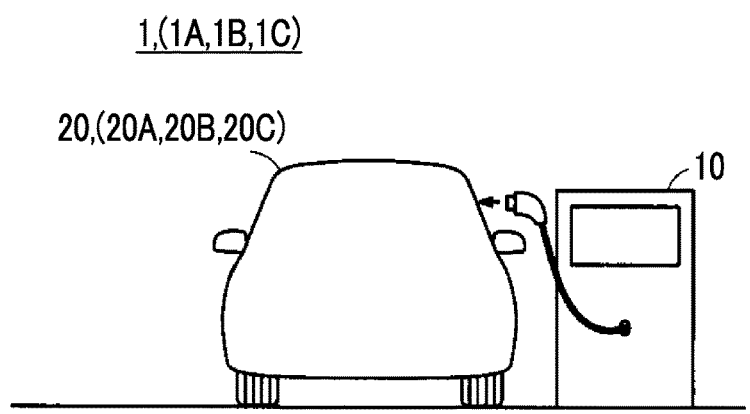
FIG. 1 is a diagram illustrating an outline of a charging system to which a vehicle according to Embodiment 1 is applied.

Hereinafter, embodiments of the disclosure will be described in detail with reference to the accompanying drawings. Meanwhile, the same or equivalent portions in the drawings are denoted by the same reference numerals and signs, and thus the description thereof will not be repeated.

Embodiment 1: Configuration of Charging System

FIG. 1 is a diagram illustrating an outline of a charging system to which a vehicle according to Embodiment 1 is applied. Referring to FIG. 1, a charging system 1 includes a charging stand 10 and a vehicle 20.

The charging stand 10 is a power feeding device that supplies power, generated based on power supplied from a system power supply (not shown), to the vehicle 20 or the like. The charging stand 10 is provided at public places (such as a gasoline stand or a convenience store). A user of the vehicle 20 can use the charging stand 10 in accordance with a fee-charging system that is set in advance. In the charging stand 10, a fee-charging system (time-based fee-charging system) is adopted in which a charging fee is charged in accordance with the use time (stand use time) of the charging stand 10.

The vehicle 20 is an electric-powered vehicle including an electrical storage device (not shown). The electrical storage device mounted in the vehicle 20 is charged by, for example, power supplied from the charging stand 10. Meanwhile, the charging stand 10 and the vehicle 20 wirelessly communicate with each other.

Figure 2:
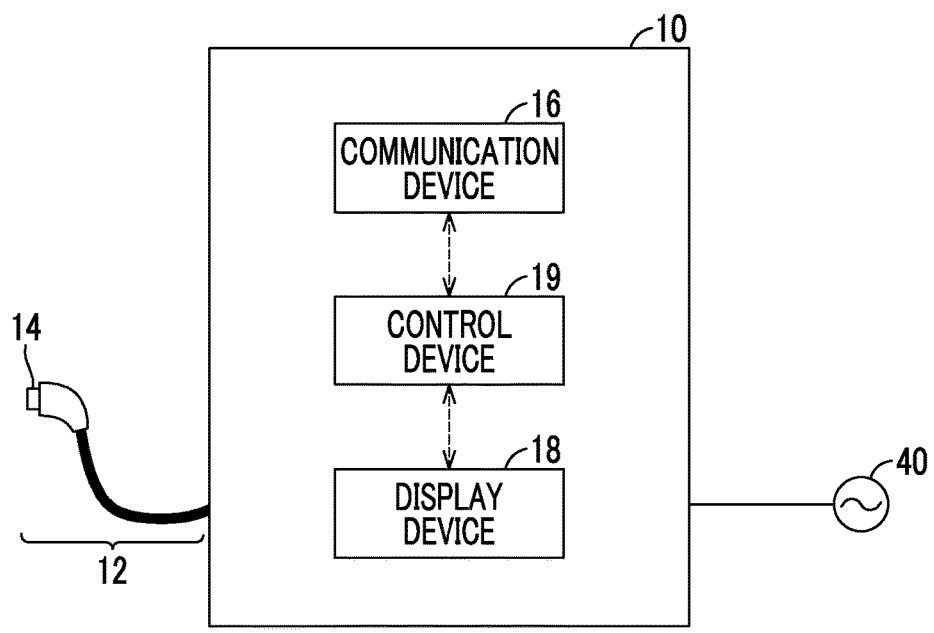
FIG. 2 is a diagram illustrating a schematic configuration of a charging stand.

FIG. 2 is a diagram illustrating a schematic configuration of a charging stand. Referring to FIG. 2, a charging cable 12 is connected to the charging stand 10. The tip of the charging cable 12 is provided with a charging connector 14. The charging connector 14 is connected to the vehicle 20. The charging stand 10 supplies power, generated based on power supplied from a system power supply 40, to the vehicle 20 through the charging cable 12. The charging stand 10 includes a communication device 16, a display device 18, and an electronic control unit 19.

The communication device 16 is configured to wirelessly communicate with the vehicle 20 present within a communicable range. The communication device 16 transmits, for example, information relating to the fee-charging system of the charging stand 10 (for example, information indicating a use fee for the charging stand 10 per unit time) and information relating to power feeding of the charging stand 10 (for example, information indicating power fed per unit time) to the vehicle 20.

The display device 18 is a display device for displaying information relating to the charging stand 10. A user can recognize the state of the charging stand 10 or the like by visually recognizing an image that is displayed on the display device 18. The display device 18 is constituted by, for example, a liquid crystal display, an organic electroluminescence (EL) display, or the like.

The electronic control unit 19 includes a central processing unit (CPU), a memory, an input and output interface, and the like (all not shown). The electronic control unit 19 realizes various functions of the charging stand 10 based on a signal from each sensor and information stored in the memory. Meanwhile, for example, the information relating to the above-described fee-charging system and the information relating to power feeding are stored in the memory included in the electronic control unit 19.

The electronic control unit 19 has a clock function. The electronic control unit 19 is configured to measure a stand use time by using the clock function. The electronic control unit 19 executes the measurement of the stand use time by starting to count the stand use time when the supply of power to the vehicle 20 is started, for example, in a state where the charging connector 14 is connected to a charging inlet 22, and stopping counting the stand use time when the supply of power to the vehicle 20 is completed. The electronic control unit 19 calculates a charging fee in accordance with the measured stand use time, for example, after the completion of the supply of power to the vehicle 20, and causes the display device 18 to display an image for urging a user to pay the calculated charging fee.

Figure 3:
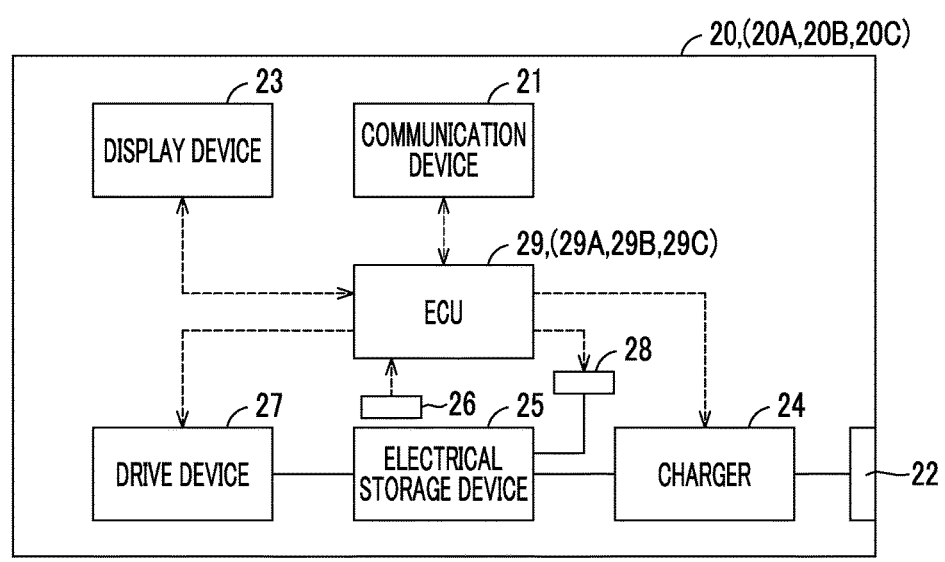
FIG. 3 is a diagram illustrating a schematic configuration of a vehicle.

FIG. 3 is a diagram illustrating a schematic configuration of a vehicle. Referring to FIG. 3, the vehicle 20 includes the charging inlet 22, a charger 24, an electrical storage device 25, a sensor unit 26, a temperature regulation system 28, a drive device 27, a communication device 21, a display device 23, and an electric control unit (ECU) 29.

The charging inlet 22 is configured such that the charging connector 14 provided for the charging cable 12 is connected thereto. In a state where the charging connector 14 is connected to the charging inlet 22, power is supplied from the charging stand 10 to the vehicle 20.

The charger 24 converts power supplied from the charging stand 10 into the voltage level of the electrical storage device 25 and outputs the converted voltage level to the electrical storage device 25. The charger 24 includes, for example, a rectifier.

The electrical storage device 25 accumulates power from the charger 24. The power accumulated in the electrical storage device 25 is output to the drive device 27. The electrical storage device 25 is configured to include, for example, a secondary battery such as a nickel-hydrogen battery or a lithium-ion battery, an electric double-layer capacitor, and the like.

The sensor unit 26 includes a voltage sensor, a current sensor and a temperature sensor. The voltage sensor, the current sensor and the temperature sensor detects the voltage, current and temperature of the electrical storage device 25, respectively. The detection results are output to the ECU 29.

The temperature regulation system 28 includes a refrigerant circuit. The temperature regulation system 28 is configured to perform air conditioning (cooling or warming) within the vehicle cabin using a refrigerant circulating through the refrigerant circuit. In addition, the temperature regulation system 28 is configured to cool the electrical storage device 25 using the refrigerant circulating through the refrigerant circuit. Meanwhile, the cooling of the electrical storage device 25 may be performed by, for example, a cooling fan.

The drive device 27 generates drive force for causing the vehicle 20 to travel by driving drive wheels (not shown). The drive device 27 includes converter, an inverter and the like that receive a supply of power from the electrical storage device 25, that are not particularly shown.

The communication device 21 is configured to wirelessly communicate with the charging stand 10 present within a communicable range. The communication device 21 receives, for example, the information relating to the above-described fee-charging system and the information relating to the above-described power feeding from the charging stand 10. Communication between the communication device 16 of the charging stand 10 and the communication device 21 of the vehicle 20 is automatically established, for example, in a case where the vehicle 20 enters into the communicable range of the charging stand 10.

The display device 23 is a display device for displaying information relating to the vehicle 20. A user can recognize the state of the vehicle 20 or the like by visually recognizing an image that is displayed on the vehicle 20. The display device 23 is constituted by, for example, a liquid crystal display, an organic EL display, or the like. In addition, a touch panel is provided on the display device 23. A user of the vehicle 20 can input a command by operating (touching) the touch panel.

The ECU 29 includes a CPU, a memory, and an input and output interface, and the like (all not shown). The ECU 29 realizes various functions of the vehicle 20 based on a signal from each sensor and information stored in the memory. The ECU 29 executes, for example, the following processes.

In a case where the temperature of the electrical storage device 25 becomes higher than a predetermined level, it is generally known that the deterioration of the electrical storage device 25 progresses. In order to suppress such a problem, for example, in a case where the charging connector 14 is connected to the charging inlet 22, and then the temperature of the electrical storage device 25 is equal to or higher than a first predetermined temperature, the ECU 29 cools the electrical storage device 25 by controlling the temperature regulation system 28 before the electrical storage device 25 starts to be charged. Such control is also called "pre-charge cooling" hereinafter. The progress of the deterioration of the electrical storage device 25 can be suppressed by performing the pre-charge cooling.

Meanwhile, the first predetermined temperature is, for example, a temperature having a high possibility of the temperature of the electrical storage device 25 exceeding the predetermined level in a case where the electrical storage device 25 is charged without cooling the electrical storage device 25. In addition, power supplied from the charging stand 10 is used in the operation of the temperature regulation system 28 for the purpose of the pre-charge cooling. Therefore, the stand use time is counted even while the pre-charge cooling is performed.

In addition, in a case where the temperature of the electrical storage device 25 is set to be equal to or greater than a second predetermined temperature during the charging of the electrical storage device 25, the ECU 29 suppresses charging power by controlling the charger 24. Such control is also called "charging suppression at high temperature" hereinafter. A rise in the temperature of the electrical storage device 25 is suppressed by suppressing the charging power. As a result, it is possible to suppress the progress of the deterioration of the electrical storage device 25. Meanwhile, the second predetermined temperature is, for example, a temperature having a high possibility of the temperature of the electrical storage device 25 exceeding the predetermined level in a case where the electrical storage device 25 continues to be charged without suppressing the charging power. In addition, the ECU 29 may control the temperature regulation system 28 so as to cool the electrical storage device 25 before the charging suppression at high temperature is performed or along with the charging suppression at high temperature.

In addition, besides, the ECU 29 suppresses the charging power by controlling the charger 24 in a case where the temperature of the electrical storage device 25 is extremely low or in a case where the voltage of the electrical storage device 25 is high, from the viewpoint of the protection of the electrical storage device 25, or the like. The control (including the charging suppression at high temperature) for suppressing the charging power is also called "various charging suppressions" hereinafter.

In addition, the ECU 29 is configured to, for example, predict the cost performance of the external charging using the charging stand 10. The ECU 29 predicts, for example, cost performance in a case where external charging has been performed until the state of charge (SOC) of the electrical storage device 25 is set to 80%. The cost performance (hereinafter, also called "CP") of the external charging refers to the term obtained by dividing the amount of charging power in the external charging by a charging fee, and is represented by the following Expression (1). The cost performance of the external charging may also be called the amount of charging power per unit fee-charging. Meanwhile, the amount of charging power refers to the amount of charging power until the SOC of the electrical storage device 25 is set to 80% from the start of charging in the external charging.

$$CP = \text{amount of charging power/charging fee} \qquad (1)$$

In the charging stand 10, since the time-based fee-charging system is adopted as a fee-charging system, Expression (1) can be modified line the following Expression (2).

$$CP = \text{amount of charging power/(stand use time} \times \text{charging fee per unit time)} \qquad (2)$$

As described above, the ECU 29 receives information indicating a charging fee per unit time (information relating to a fee-charging system) from the charging stand 10 through the communication device 21. Therefore, the ECU 29 needs to predict the amount of charging power and the stand use time in order to predict the cost performance of the external charging.

The ECU 29 calculates the SOC of the electrical storage device 25 by using, for example, the integrated value of current values of the electrical storage device 25 acquired from the sensor unit 26. The ECU 29 predicts the amount of charging power needed until the SOC is set to 80% by referring to, for example, the current SOC of the electrical storage device 25. That is, the ECU 29 is configured to predict the amount of charging power of the electrical storage device 25 in accordance with the state (such as the SOC) of the electrical storage device 25.

In addition, as described above, the ECU 29 receives information indicating power fed per unit time (information relating to power feeding) from the charging stand 10 through the communication device 21. For example, in a case where various charging suppressions need to be performed in accordance with the state of the electrical storage device 25, the ECU 29 corrects the information indicating power fed per unit time. The ECU 29 predicts a reference stand use time by dividing the predicted amount of charging power by the power fed per unit time. In a case where the above-described pre-charge cooling needs to be performed in accordance with the state of the electrical storage device 25, the ECU 29 further corrects the reference stand use time by adding a time needed for the pre-charge cooling. For example, the time needed for the pre-charge cooling may be a preset constant time, and may be predicted in accordance with the temperature of the electrical storage device 25. Thereby, the stand use time is predicted. That is, the ECU 29 is configured to predict the stand use time in accordance with the state (such as temperature or voltage) of the electrical storage device 25.

The ECU 29 can predict the cost performance of the external charging by substituting the amount of charging power and the stand use time that are predicted and the charging fee per unit time into Expression (2).

Notification Relating to Cost Performance

In the charging stand 10, the time-based fee-charging system is adopted. Therefore, in a case where the charging stand 10 is used, a charging fee increases as the stand use time becomes longer even when the amounts of charging power are set to be the same as each other.

The stand use time in the external charging may fluctuate depending on the state (such as temperature) of the electrical storage device 25. This is because the contents of charging control in the external charging may change depending on the state of the electrical storage device 25 (for example, the presence or absence of the pre-charge cooling).

Figure 4:
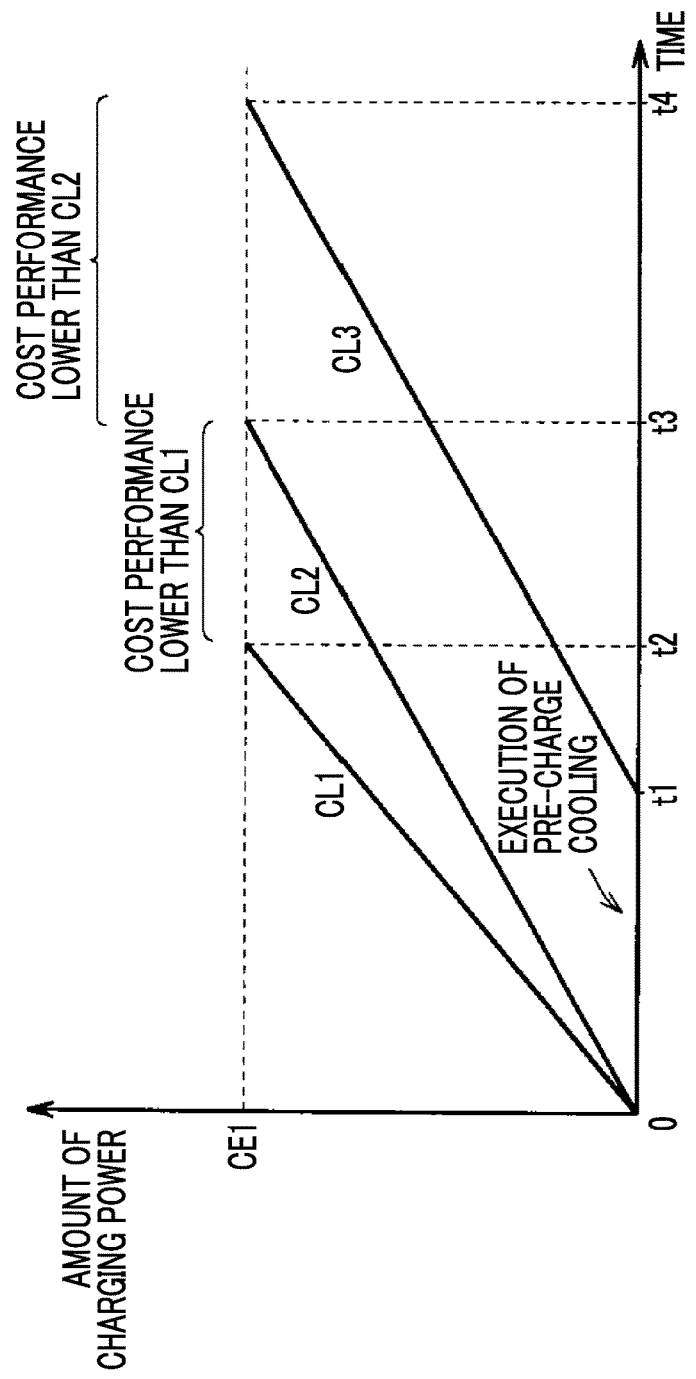
FIG. 4 is a diagram illustrating how a stand use time changes in accordance with the contents of charging control in external charging.

FIG. 4 is a diagram illustrating how a stand use time changes in accordance with the contents of charging control in external charging. Referring to FIG. 4, the horizontal axis represents a time, and the vertical axis represents the amount of charging power in the external charging.

Each of straight lines CL1 to CL3 shows the transition of the amount of charging power of the electrical storage device 25 in a case where the external charging has been performed using the charging stand 10. The straight line CL1 shows the transition of the amount of charging power in a case where the pre-charge cooling has not been performed, and various charging suppressions have not been performed. The straight line CL2 shows the transition of the amount of charging power in a case where the pre-charge cooling has not been performed, and any of various charging suppressions have been performed. The straight line CL3 shows the transition of the amount of charging power in a case where the pre-charge cooling has not been performed, and any of various charging suppressions have been performed.

In this example, at a point in time when the electrical storage device 25 is charged with the amount of charging power CE1, the SOC of the electrical storage device 25 is assumed to reach 80%. In the example shown by straight line CL1, the power fed per unit time is CE1/t2. At a point in time of time t2, the amount of charging power reaches CE1. That is, the stand use time is set to t2, and the charging fee is set to "the charging fee per unit time"×t2.

In the example shown by the straight line CL2, for example, since the charging suppression at high temperature is performed, the power fed per unit time is set to CE1/t3 ((CE1/t3)<(CE1/t2)). At a point in time of time t3, the amount of charging power reaches CE1. That is, the stand use time is set to t3, and the charging fee is set to "the charging fee per unit time"×t3. Therefore, as compared with the example shown by the straight line CL1, the charging suppression at high temperature is additionally performed, and thus the charging fee rises to "the charging fee per unit time"×(t3−t2). Since the amounts of charging power are the same as each other in both the straight lines CL1, CL2, the charging suppression at high temperature is additionally performed, and thus the cost performance of the external charging decreases.

In the example shown by the straight line CL3, as compared with the example shown by the straight line CL2, the pre-charge cooling (times 0 to t1) is further performed. Therefore, the charging of the electrical storage device 25 is not started until time t1. Thereafter, at a point in time of time t4, the amount of charging power reaches CE1. That is, the stand use time is set to t4, and the charging fee is set to "the charging fee per unit time"×t4. Therefore, as compared with the case shown by the straight line CL2, the pre-charge cooling is additionally performed, and thus the charging fee rises to "the charging fee per unit time"×(t4−t3). Since the amounts of charging power are the same as each other in both the straight lines CL2, CL3, the pre-charge cooling is additionally performed, and thus the cost performance of the external charging further decreases.

In this manner, the cost performance of the external charging fluctuates in accordance with the contents of charging control of the electrical storage device 25. Therefore, the pre-charge cooling or the like is performed depending on the state of the electrical storage device 25. As result, there is the possibility of the external charging having low cost performance being performed. It is not preferable that such external charging having low cost performance is performed in a state where a user of the vehicle 20 does not recognize the low cost performance.

Consequently, in the vehicle 20 according, to Embodiment 1, the ECU 29 first predicts the cost performance of the external charging using the charging stand 10 after the establishment of communication between the communication devices 16, 21. In a case where the predicted cost performance is less than a first predetermined value, the ECU 29 controls the display device 23 so as to execute a notification to a user. For example, in a case where the predicted cost performance is less than the first predetermined value, the ECU 29 causes the display device 23 to display a warning screen. Meanwhile, the first predetermined value is, for example, a value that is set in advance after the consideration of average cost performance in the external charging.

Figure 5:
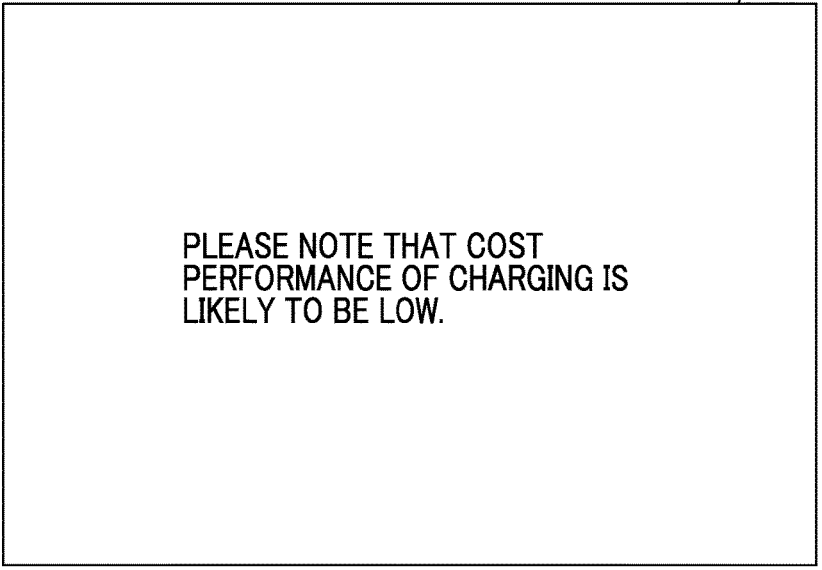
FIG. 5 is a diagram illustrating an example of a warning screen.

FIG. 5 is a diagram illustrating an example of a warning screen. Referring to FIG. 5, for example, in a case where the predicted cost performance is less than the first predetermined value, a message for causing a user to recognize the purport, such as "Please note that the cost performance of charging is likely to be low.", that the cost performance of the external charging is low is displayed on the display device 23. Thereby, a user of the vehicle 20 can prevent the external charging from being executed in a case where the cost performance of the external charging is low.

Processing Procedure of Notification Relating, to Cost Performance

Figure 6:
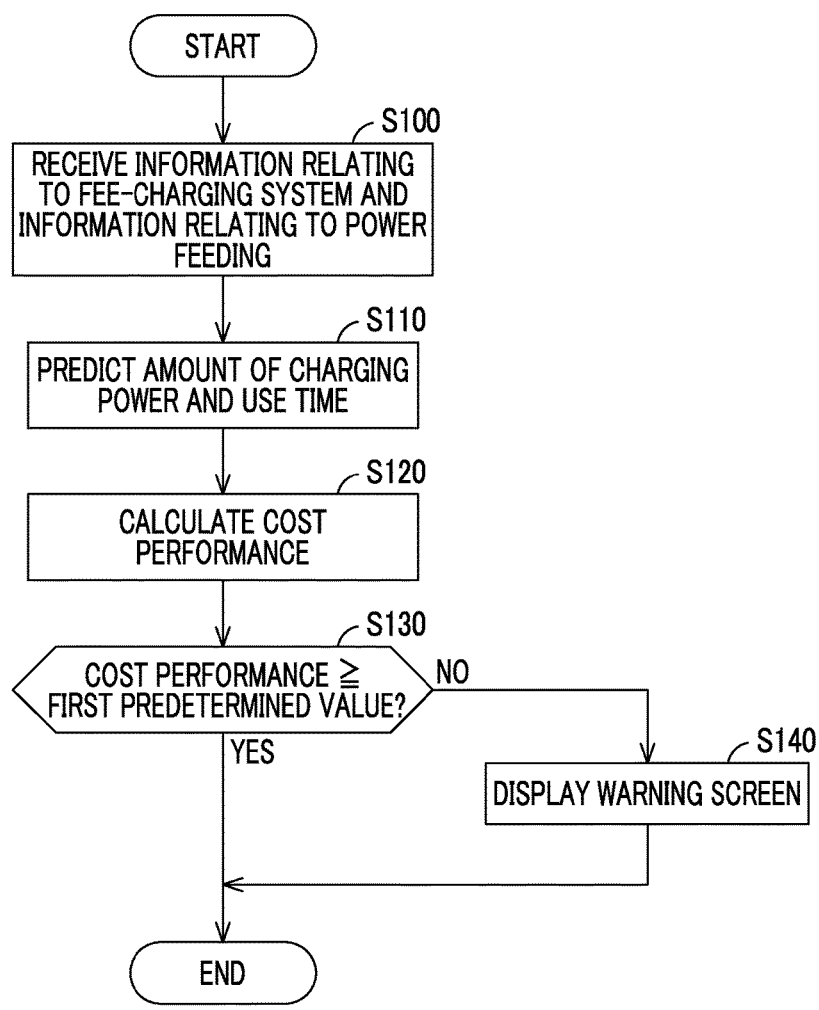
FIG. 6 is a flowchart illustrating a processing procedure of notifying a user that the cost performance of external charging is low.

FIG. 6 is a flowchart illustrating a processing procedure of notifying a user that the cost performance of external charging is low. Processes shown in the flowchart are executed at a timing when communication between the communication devices 16, 21 is established. That is, the processes shown in the flowchart are executed at a timing when the vehicle 20 enters into the communicable range of the charging stand 10 (timing before the charging connector 14 is connected to the charging inlet 22).

Referring to FIG. 6, the ECU 29 receives information relating to the fee-charging system of the charging stand 10 and information relating to power feeding of the charging stand 10 from the charging stand 10 through the communication device 21 (step S100). Using the aforementioned method, the ECU 29 predicts the amount of charging power and the stand use time in a case where the external charging based on the charging stand 10 is performed (step S110). The ECU 29 calculates the cost performance of the external charging by substituting the amount of charging power and the stand use time that are predicted and the received information relating to the fee-charging system (information indicating a charging fee per unit time) into Expression (2) (step S120).

Thereafter, the ECU 29 determines whether the calculated cost performance is equal to or greater than the first predetermined value (step S130). In a case where the ECU determines that the calculated cost performance is equal to or greater than the first predetermined value (YES in step S130), the process proceeds to the end (a notification to a user is not executed).

On the other hand, in a case where the ECU determines that the calculated cost performance is less than the first predetermined value (NO in step S130), the ECU 29 controls the display device 23 so as to display a warning screen (FIG. 5) (step S140). Thereafter, the process proceeds to the end.

As described above, in the according to the vehicle 20 Embodiment 1, the ECU 29 controls the display device 23 so as to execute a notification to a user (display a warning screen) in a case where the predicted cost performance of the external charging is less than the first predetermined value. Thereby, a user of the vehicle 20 can prevent the external charging from being executed in a case where the cost performance of the external charging is low.

Modification Example of Embodiment 1

In the vehicle 20 according to Embodiment 1, the cost performance of the external charging is actually calculated. In a case where the calculated cost performance is less than the first predetermined value, a notification to a user is performed. In the vehicle 20 according to the modification example of Embodiment 1, in a case where the cost performance of the external charging is not actually calculated, and a "condition in which the cost performance is regarded as being less than the first predetermined value" is established, a notification to a user is performed.

In the vehicle 20 according to the modification example of Embodiment 1, for example, in a case where the pre-charge cooling is performed, and in a case where various charging suppressions are predicted to be performed, the "condition in which the cost performance is regarded as being less than the first predetermined value" is established.

Figure 7:
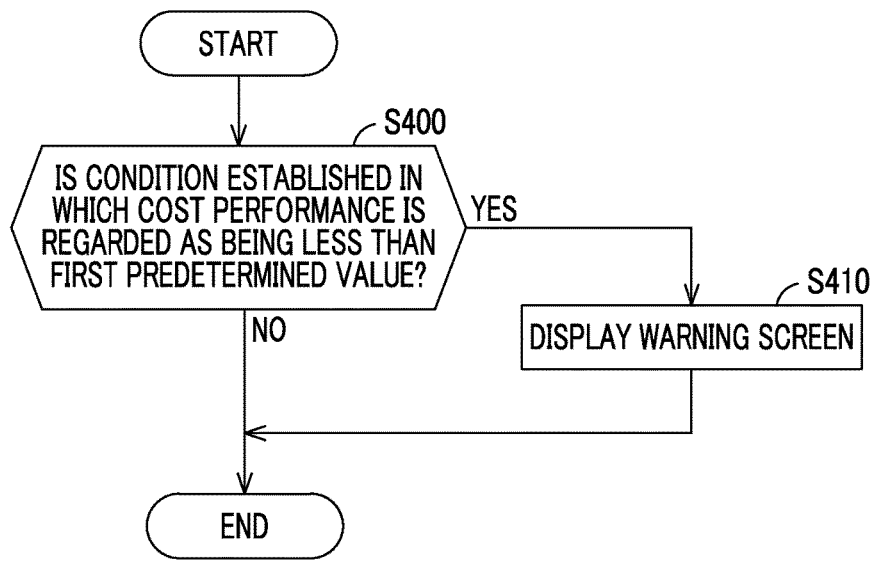
FIG. 7 is a flowchart illustrating a processing procedure of notifying a user that the cost performance of external charging is low, in a modification example of Embodiment 1.

FIG. 7 is a flowchart illustrating a processing procedure of notifying a user that the cost performance of the external charging is low, in the modification example of Embodiment 1. Processes shown in the flowchart are executed at a timing when communication between the communication devices 16, 21 is established. Meanwhile, the process shown in step S410 is the same as the process shown in step S140 in FIG. 6.

Referring to FIG. 7, the ECU 29 determines whether the "condition in which the cost performance is regarded as being less than the first predetermined value" is established, without actually calculating the cost performance of the external charging (step S400). In a case where the ECU determines that the condition is not established (NO in step S400), the process proceeds to the end (a notification to a user is not executed.). On the other hand, in a case where the ECU determines that the condition is established (YES in step S400), the ECU 29 controls the display device 23 so as to display a warning screen (FIG. 5) (step S410).

As described above, in the modification example of Embodiment 1, in a case where the cost performance of the external charging is not actually calculated, and the cost performance is regarded as being less than the first predetermined value, a notification to a user is executed. Therefore, with the vehicle 20, it is possible to cause a user of the vehicle 20 to recognize that the cost performance of the external charging is low, without actually calculating the cost performance of the external charging.

Embodiment 2

In the vehicle 20 according to Embodiment 1, a notification to a user is performed at a timing before the charging connector 14 is connected to the charging inlet 22. In a vehicle according to Embodiment 2, in a case where the predicted cost performance of the external charging is less than the first predetermined value, a notification to a user is performed at a timing after the charging connector 14 is connected to the charging inlet 22. Since the timings of notifications to a user are different from each other, the contents of notifications to a user are also different from each other. Hereinafter, the detailed description thereof will be given.

Referring back to FIGS. 1 and 3, in Embodiment 2, a charging system 1A includes a charging stand 10 and a vehicle 20A. The vehicle 20A includes an ECU 29A.

The ECU 29A includes a CPU, a memory, an input and output interface, and the like (all not shown). The ECU 29A realizes various functions of the vehicle 20A based on a signal from each sensor and information stored in the memory. The ECU 29A is configured to perform the above-described pre-charge cooling and various charging suppressions, and is further configured to predict the cost performance of the external charging.

The supply of power from the charging stand 10 to the vehicle 20 is assumed to be automatically started depending on the charging connector 14 being connected to the charging inlet 22. In this case, since the external charging is automatically started regardless of the cost performance of the external charging, there is the possibility of external charging having low cost performance being performed in a user's unintended state.

Consequently, in the vehicle 20A according to Embodiment 2, the ECU 29A first predicts the cost performance of the external charging using the charging stand 10. In a case where the predicted cost performance of the external charging is less than the first predetermined value, the ECU 29A controls the display device 23 so as to display a screen for urging a user to select whether or not to execute the external charging (hereinafter, also called a "screen for selecting whether or not to charge"). Meanwhile, since the supply of power from the charging stand 10 to the vehicle 20 is not started while the screen for selecting whether or not to charge is displayed, the stand use time is not started to be count, and fee-charging is not performed.

Figure 8:
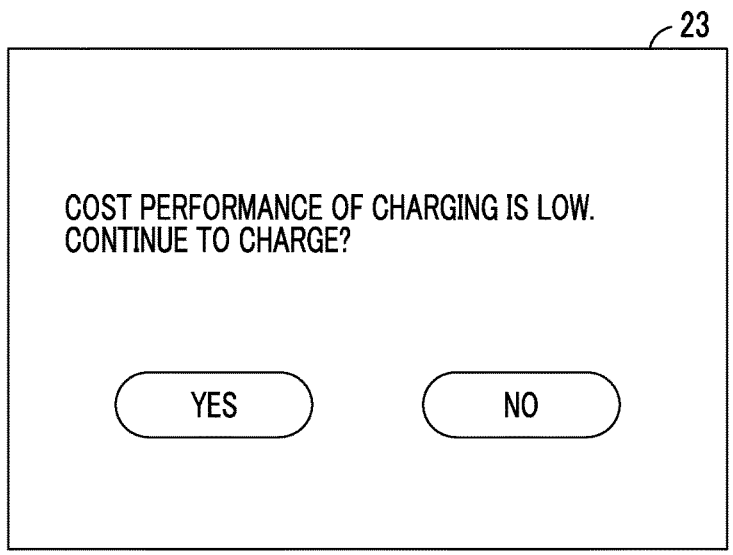
FIG. 8 is a diagram illustrating an example of a screen for selecting whether or not to charge.

FIG. 8 is a diagram illustrating an example of a screen for selecting whether or not to charge. Referring to FIG. 8, for example, the screen for selecting whether or not to charge contains a message of "The cost performance of charging is low. Continue to charge?" (contents of a notification to a user), and selection buttons of "YES" and "NO". A user of the vehicle 20A can select whether or not to perform the external charging in a case where the cost performance of the external charging is low by touching a position displayed as "YES" or "NO" on the display device 23. For example, a user of the vehicle 20A can prevent the external charging having low cost performance from being performed by selecting "NO".

Figure 9:
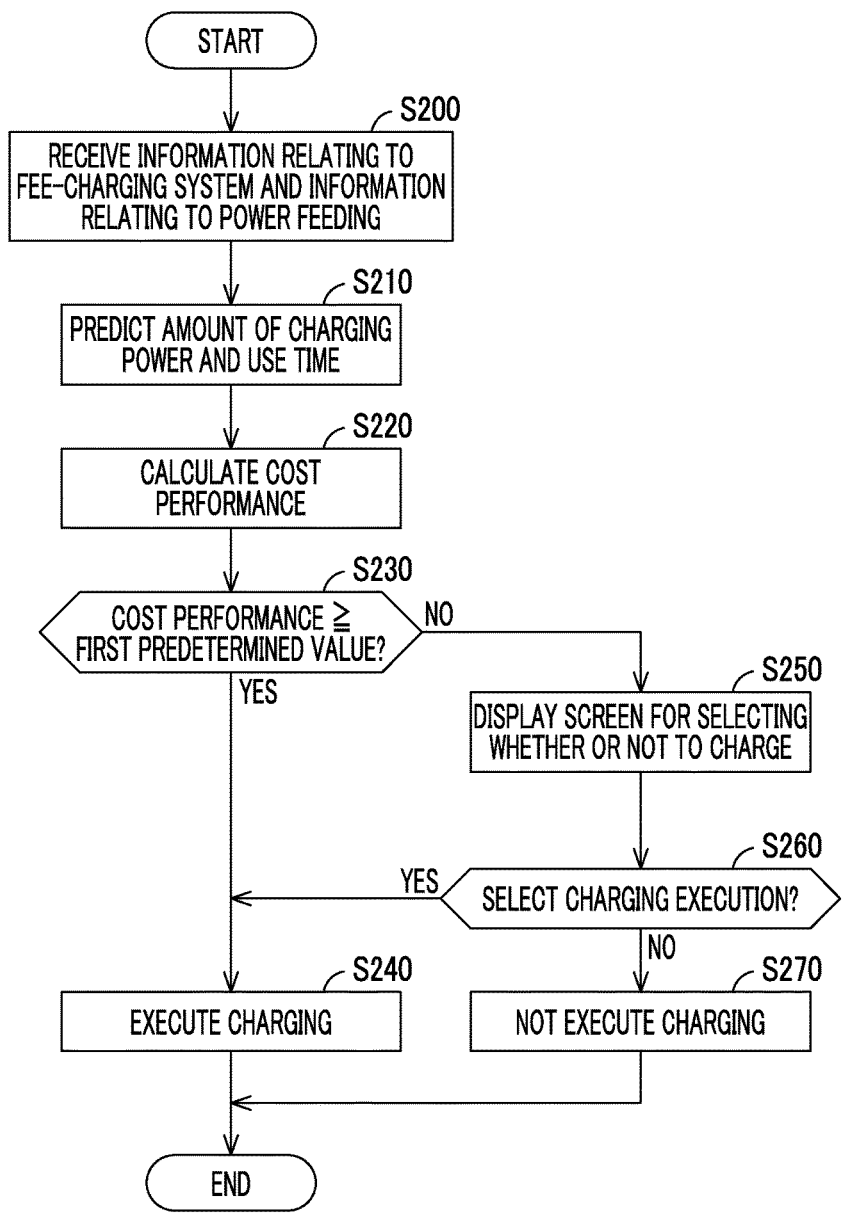
FIG. 9 is a flowchart illustrating a processing procedure of notifying a user that the cost performance of the external charging is low, in Embodiment 2.

FIG. 9 is a flowchart illustrating a processing procedure of notifying a user that the cost performance of the external charging is low, in Embodiment 2. Processes shown in the flowchart are executed at a timing when the charging connector 14 is connected to the charging inlet 22. Meanwhile, processes of steps S200 to S230 are the same as the processes of steps S100 to S130 in FIG. 6, respectively, the description thereof will not be repeated.

Referring to FIG. 9, in step S230, in a case where the ECU determines that the cost performance of the external charging is equal to or greater than the first predetermined value (YES in step S230), the ECU 29A controls the charger 24 so as to execute the external charging (step S240). That is, in this case, a notification to a user is not executed.

On the other hand, the ECU determines that the cost performance of the external charging is less than the first predetermined value (NO in step S230), the ECU 29A controls the display device 23 so as to display a screen for selecting whether or not to charge (step S250). Thereafter, the ECU 29A determines whether the YES button (for example, "YES" in FIG. 8) has been selected by a user (step S260).

In a case where the ECU determines that the YES button has been selected (YES in step S260), the ECU 29A controls the charger 24 so as to execute the external charging (step S240). On the other hand, in a case where the ECU determines that the NO button (for example, "NO" in FIG. 8) has been selected (NO in step S260), the ECU 29A controls the charger 24 so as not to execute the external charging (step S270). Thereafter, the process proceeds to the end.

As described above, in the vehicle 20A according to Embodiment 2, a notification to a user (screen for selecting whether or not to charge) contains contents for urging the user to select whether or not to execute the external charging through a touch panel on the display device 23, and whether or not to execute the external charging is not determined until the user selects either of the buttons. Therefore, in a case where the cost performance of the external charging is low, the user of the vehicle 20A can select whether or not to perform the external charging through the touch panel, in a state where the external charging is not started.

Modification Example of Embodiment 2

In the vehicle 20A according to Embodiment 2, the cost performance of the external charging is actually calculated. In a case where the calculated cost performance is less than the first predetermined value, a notification to a user (display of a screen for selecting whether or not to charge) is performed. In the vehicle 20A according to a modification example of Embodiment 2, in a case where the cost performance of the external charging is not actually calculated, and a "condition in which the cost performance is regarded as being less than the first predetermined value" is established, a notification to a user is performed.

In the vehicle 20A according to the modification example of Embodiment 2, for example, in a case where the pre-charge cooling is performed, or in a case where various charging suppressions are predicted to be performed, the "condition in winch the cost performance is regarded as being less than the first predetermined value" is established.

Figure 10:
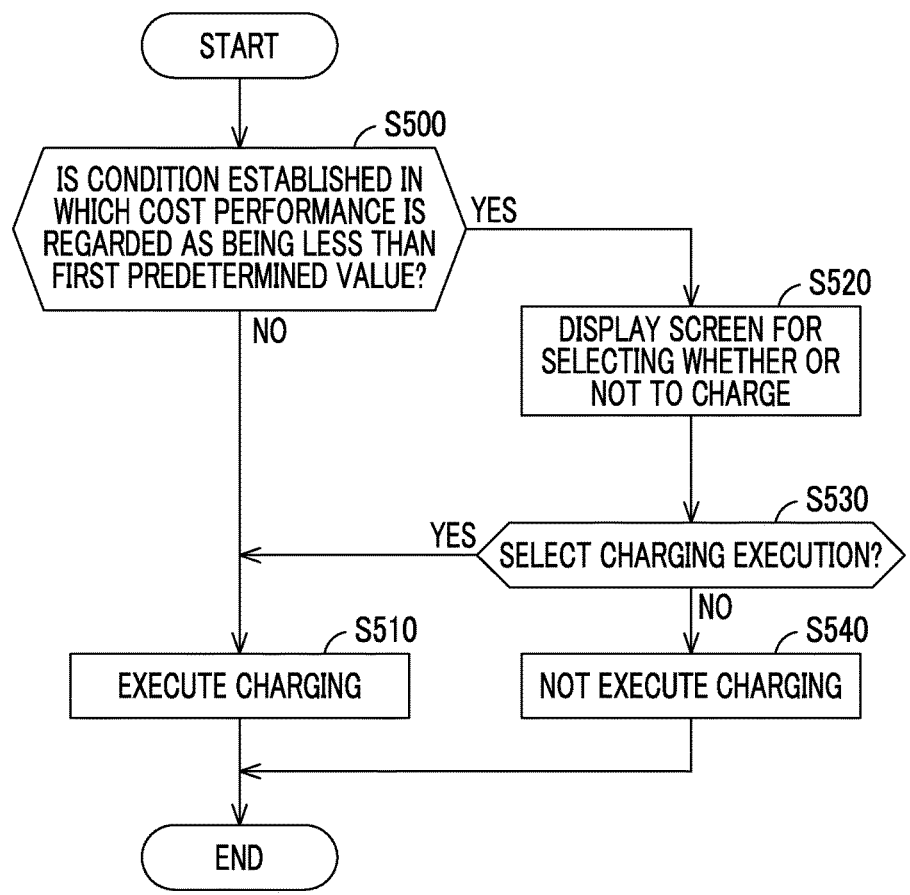
FIG. 10 is a flowchart illustrating a processing procedure of notifying a user that the cost performance of the external charging is low, in a modification example of Embodiment 2.

FIG. 10 is a flowchart illustrating a processing procedure of notifying a user that the cost performance of the external charging is low, in the modification example of Embodiment 2. Processes shown in the flowchart are executed at a timing when the charging connector 14 is connected to the charging inlet 22. Meanwhile, processes shown in steps S510 to S540 are the same as the processes shown in steps S240 to S270 in FIG. 9, respectively.

Referring to FIG. 10, the ECU 29A determines whether the "condition in which the cost performance is regarded as being less than the first predetermined value" is established, without actually calculating the cost performance of the external charging (step S500). In a case where the ECU determines that the condition is not established (NO in step S500), the ECU 29A controls the charger 24 so as to execute the external charging (step S510). On the other hand, in a case where the ECU determines that the condition is established (YES in step S500), the ECU 29A controls the display device 23 so as to display a screen for selecting whether or not to charge (step S520).

As described above, in the modification example of Embodiment 2, in a case where the cost performance of the external charging is not actually calculated, and the cost performance is regarded as being less than the first predetermined value, a notification to a user (display of a screen for selecting whether or not to charge) is executed. Therefore, with the vehicle 20A, in a case where the cost performance is regarded as being low without actually calculating the cost performance of the external charging, it is possible to cause a user to select whether or not to perform the external charging.

Embodiment 3

In the vehicle 20A according to Embodiment 2, in a case where the cost performance of the external charging is less than the first predetermined value, whether or not to perform the external, charging has been selected by a user. In a vehicle according to Embodiment 3, in a case where the cost performance of the external charging is less than the first predetermined value, whether or not to perform the external charging is automatically selected by an ECU. Hereinafter, the detailed description will be given.

Referring back to FIGS. 1 and 3, in Embodiment 3, a charging system 1B includes a charging stand 10 and a vehicle 20B. The vehicle 20B includes an ECU 29B.

The ECU 29B includes a CPU, a memory, an input and output interface, and the like (all not shown). The ECU 29B realizes various functions of the vehicle 20B based on a signal from each sensor and information stored in the memory. The ECU 29B is configured to perform the above-described pre-charge cooling and various charging suppressions, and is further configured to predict the cost performance of the external charging.

In Embodiment 2, a user of the vehicle 20A selects whether or not to execute the external charging. In such a case, a user's opinion can be accurately reflected with respect to whether or not to execute the external charging, whereas it takes time and effort for the user to have to select whether or not to execute the external charging.

Consequently, in the vehicle 20B according to Embodiment 3, the ECU 29B first predicts the cost performance of the external charging using the charging stand 10. The ECU 29B controls the charger 24 so as to automatically execute the external charging when the predicted cost performance is equal to or greater than a second predetermined value (second predetermined value<first predetermined value). On the other hand, the ECU 29B controls the charger 24 so as not to execute the external charging in a case where the cost performance is less than the second predetermined value. With the vehicle 20B, since whether or not to execute the external charging is automatically determined depending on where the cost performance is equal to or greater than the second predetermined value, it is possible to execute the external charging in a case of being valid to some extent, and to reduce a user's time and effort.

In addition, in the vehicle 20B, a warning screen is displayed on the display device 23 in both a case where the external charging is automatically executed when the cost performance is less than the first predetermined value and a case where the external charging is not executed (a notification to a user is performed).

Figure 11:
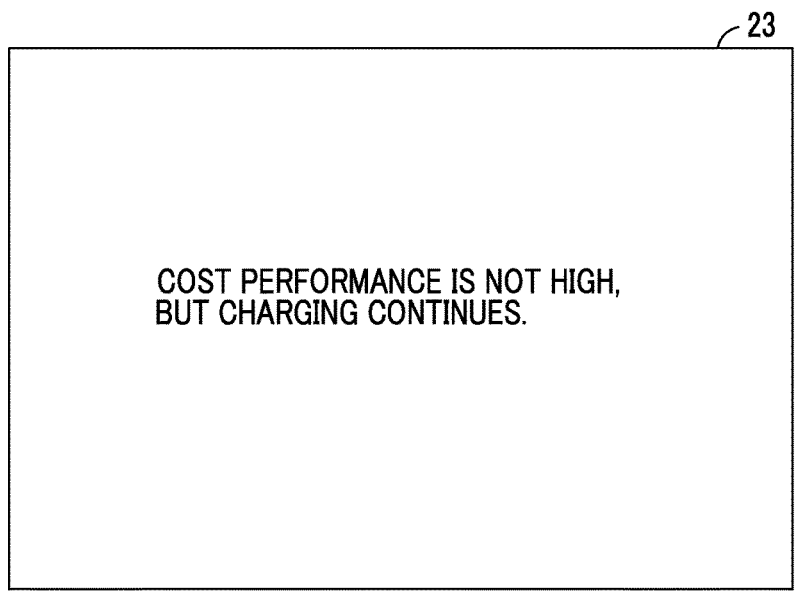
FIG. 11 is a diagram illustrating an example of a warning screen that is displayed on a display device in a case where the external charging is automatically executed when cost performance is less than a first predetermined value, in Embodiment 3.

FIG. 11 is a diagram illustrating an example of a warning screen that is displayed on the display device 23 in a case where the external charging is automatically executed when the cost performance is less than the first predetermined value. Referring to FIG. 11, for example, in a case where the predicted cost performance is less than the first predetermined value, and the cost performance is equal to or greater than the second predetermined value, a message of "The cost performance is not high, but charging continues." is displayed on the display device 23. Thereby, a user of the vehicle 20B can recognize that the cost performance of charging that is currently being performed is low, and to stop charging when the user hopes to stop charging.

Figure 12:
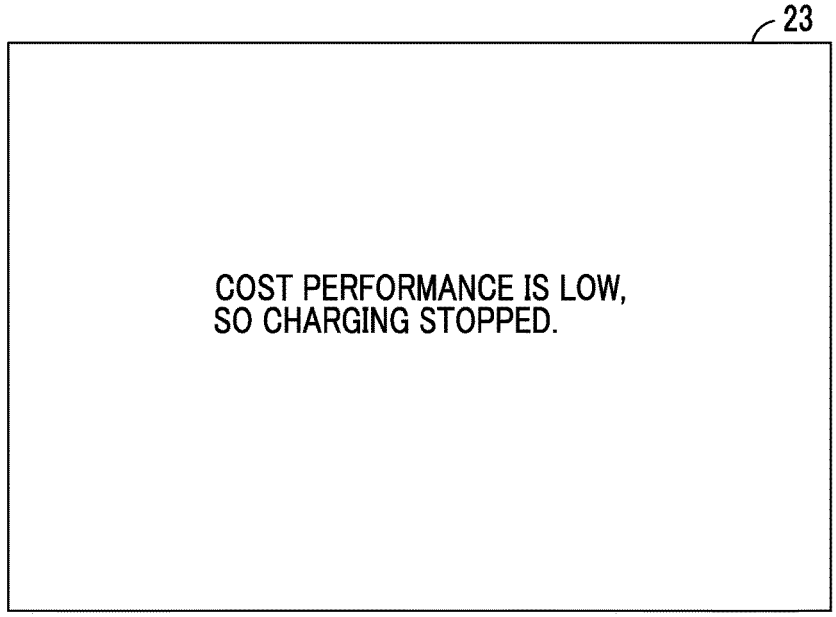
FIG. 12 is a diagram illustrating an example of a warning screen that is displayed on the display device in a case where the external charging is not executed.

FIG. 12 is a diagram illustrating an example of a warning screen that is displayed on the display device 23 in a case where the external charging is not executed. Referring to FIG. 12, for example, in a case where the predicted cost performance is less than the second predetermined value, a message of "The cost performance is low, so charging stopped." is displayed on the display device 23. Thereby, a user of the vehicle 20B can recognize the reason for the external charging being stopped.

Figure 13:
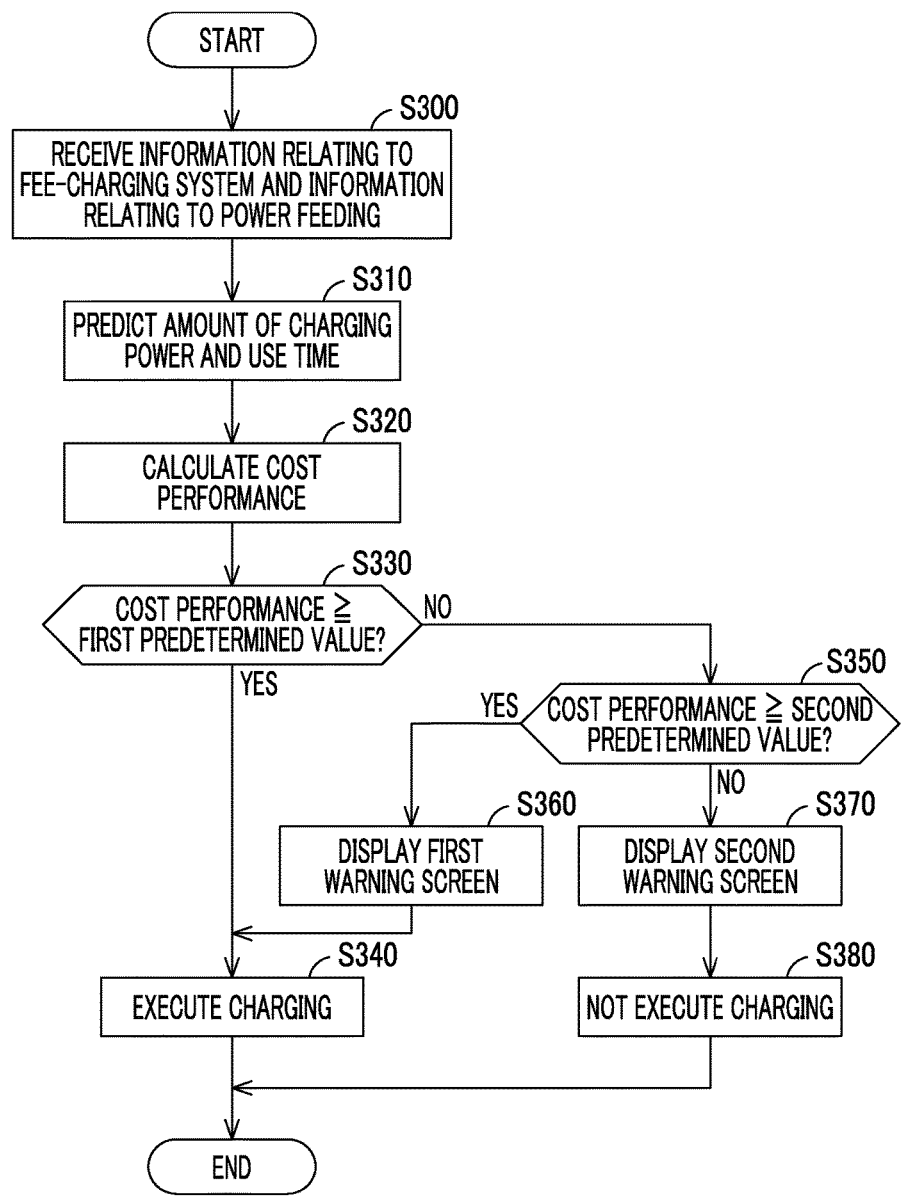
FIG. 13 is a flowchart illustrating a processing procedure of the external charging.

FIG. 13 is a flowchart illustrating a processing procedure of the external charging, in Embodiment 3. Processes shown in the flowchart are executed at a timing when the charging connector 14 is connected to the charging inlet 22. Meanwhile, processes of steps S300 to S330 are the same as the processes of steps S200 to S230 in FIG. 9, respectively. In addition, processes of steps S340, S380 are the same as the processes of steps S240, S270 in FIG. 9, respectively. Therefore, the description of the same processes as those in FIG. 9 will not be repeated.

Referring to FIG. 13, in step S330, in a case where the ECU determines that the cost performance of the external charging is less than the first predetermined value (NO in step S330), the ECU 29B determines whether the cost performance is equal to or greater than the second predetermined value (step S350).

In a case where the ECU determines that the cost performance is equal to or greater than the second predetermined value (YES in step S350), the ECU 29B controls the display device 23 so as to display a first warning screen (FIG. 11) (step S360), and then controls the charger 24 so as to execute the external charging (step S340). On the other hand, in a case where the ECU determines that the cost performance is less than the second predetermined value (NO in step S350), the ECU 29B controls the display device 23 so as to display a second warning screen (FIG. 12) (step S370), and then controls the charger 24 so as not to execute the external charging (step S380).

As described above, in the vehicle 20B according to Embodiment 3, the ECU 29B controls the charger 24 so as to automatically execute the external charging when the predicted cost performance is equal to or greater than the second predetermined value. On the other hand, the ECU 29B controls the charger 24 so as not to execute the external charging in a case where the cost performance is less than the second predetermined value. With the vehicle 20B, it is possible to execute the external charging in a case of being valid to some extent, and to reduce a user's time and effort (selection of whether or not to execute the external charging).

Modification Example of Embodiment 3

In the vehicle 20B according to Embodiment 3, the cost performance of the external charging is actually calculated. In a case where the calculated cost performance is less than the first predetermined value, and the cost performance is equal to or greater than the second predetermined value (second predetermined value<first predetermined value), the external charging is automatically executed. On the other hand, in a case where the calculated cost performance is less than the second predetermined value, the external charging is not executed. In the vehicle 20B according to a modification example of Embodiment 3, the cost performance of the external charging is not actually calculated. In a case where the "condition in which the cost performance is regarded as being less than the first predetermined value" is established, and a "condition in which the cost performance is regarded as being less than the second predetermined value" is not established, the external charging is automatically executed. On the other hand, in a case where the "condition in which the cost performance is regarded as being less than the second predetermined value" is established, the external charging is not executed.

In the vehicle 20B according to the modification example of Embodiment 3, for example, in a case where the pre-charge cooling is performed, and various charging suppressions are predicted to be performed, the "condition in which the cost performance is regarded as being less than the first predetermined value" is established.

In addition, for example, in a case where the pre-charge cooling is performed, the cost performance of the external charging is assumed to be lower than in a case where various charging suppressions are performed. In such a case, for example, in a case where the pre-charge cooling is performed, the "condition in which the cost performance is regarded as being less than the second predetermined value" is established.

Figure 14:
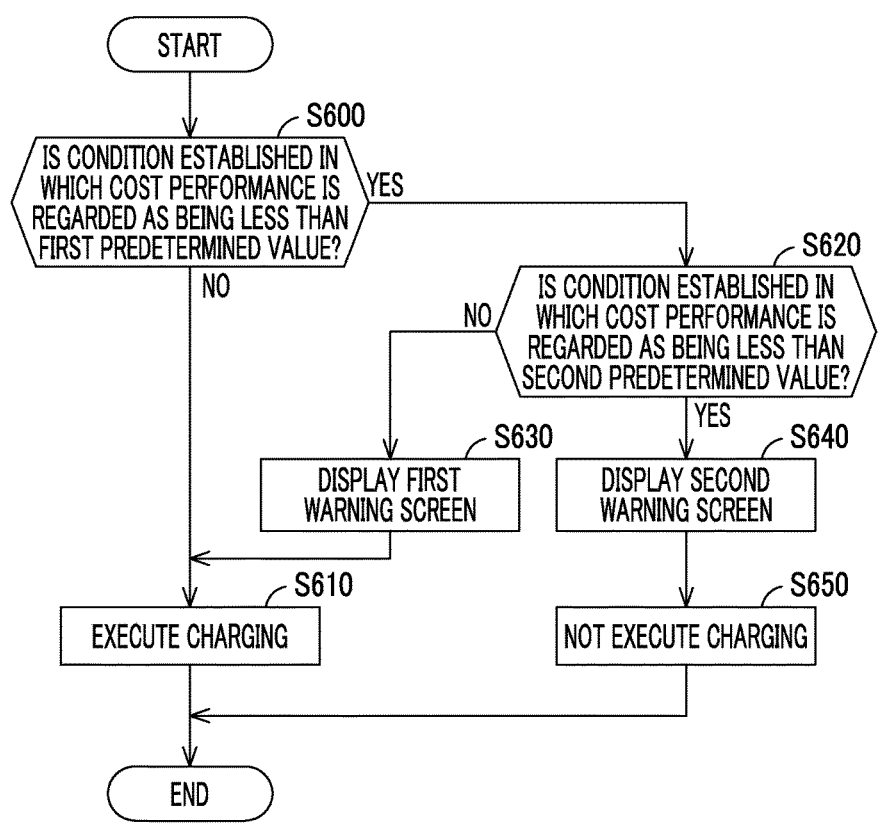
FIG. 14 is a flowchart illustrating a processing procedure of the external charging, in a modification example of Embodiment 3.

FIG. 14 is a flowchart illustrating a processing procedure of the external charging, in the modification example of Embodiment 3. Processes shown in the flowchart are executed at a timing when the charging connector 14 is connected to the charging inlet 22. Meanwhile, processes of steps S610, S630 to S650 are the same as the processes of steps S340, S360 to S380 in FIG. 13, respectively, and thus the description thereof will not be repeated.

Referring to FIG. 14, the ECU 29B determines whether the "condition in which the cost performance is regarded as being less than the first predetermined value" is established, without actually calculating the cost performance of the external charging (step S600). In a case where the ECU determines that the condition is not established (NO in step S600), the ECU 29B controls the charger 24 so as to execute the external charging (step S610). On the other hand, in a case where the ECU determines that the condition is established (YES in step S600), the ECU 29B determines whether the "condition in which the cost performance is regarded as being less than the second predetermined value" is established (step S620).

In a case where the ECU determines that the condition is not established (NO in step S620), the ECU 29B controls the display device 23 so as to display the first warning screen (FIG. 11) (step S630), and then controls the charger 24 so as to execute the external charging (step S610). On the other hand, in a case where the ECU determines that the condition is established (YES in step S620), the ECU 29B controls the display device 23 so as to display the second warning screen (FIG. 12) (step S640), and then controls the charger 24 so as not to execute the external charging (step S650).

As described above, in the modification example of Embodiment 3, the cost performance of the external charging is not actually calculated. In a case where the "condition in which the cost performance is regarded as being less than the first predetermined value" is established, and the "condition in which the cost performance is regarded as being less than the second predetermined value" is not established, the external charging is automatically executed. On the other hand, in a case where the "condition in which the cost performance is regarded as being less than the second predetermined value" is established, the external charging is not executed. Therefore, with the vehicle 20B, it is possible to execute the external charging in a case of being valid to some extent without actually calculating the cost performance of the external charging, and to reduce a user's time and effort (selection of whether or not to execute the external charging).

Embodiment 4

In a vehicle according to Embodiment 4, the temperature of the electrical storage device is confirmed before the start of external charging. In a case where the temperature of the electrical storage device is equal to or higher than the first predetermined temperature, a screen for urging a user to select whether or not to perform the pre-charge cooling (hereinafter, also called a "screen for selecting whether or not to execute pre-charge cooling") is displayed on the display device. The screen for selecting whether or not to execute the pre-charge cooling contains a message (contents of a notification to a user) for causing a user to recognize a decrease in the cost performance of the external charging in a case where the pit-charge cooling has been performed, in addition to a message for urging the user to select whether or not to perform the pre-charge cooling. Hereinafter, the detailed description thereof will be given.

Referring back to FIGS. 1 and 3, in Embodiment 4, a charging system IC includes a charging stand 10 and a vehicle 20C. The vehicle 20C includes an ECU 29C.

The ECU 29C includes a CPU, a memory, and input and output interface, and the like (all not shown). The ECU 29C realizes various functions of the vehicle 20C based on a signal from each sensor and information stored in the memory. The ECU 29C is configured to perform the above-described pre-charge cooling.

In a case where the temperature of the electrical storage device 25 is equal to or higher than the first predetermined temperature, a screen for selecting whether or not to execute the pre-charge cooling is displayed on the display device 23. A message or the like indicating a decrease in the cost performance of the external charging in a case where the pre-charge cooling has been performed is assumed not to be contained in the screen for selecting whether or not to execute the pre-charge cooling. In this case, a user is likely to select the execution of the pre-charge cooling in a state where the user does not recognize the disadvantage of the pre-charge cooling.

Consequently, in the vehicle 20C according to Embodiment 4, the screen for selecting whether or not to execute the pre-charge cooling contains a message indicating a decrease in the cost performance of the external charging in a case where the pre-charge cooling has been performed, in addition to the message for urging a user to select whether or not to perform the pre-charge cooling.

Figure 15:
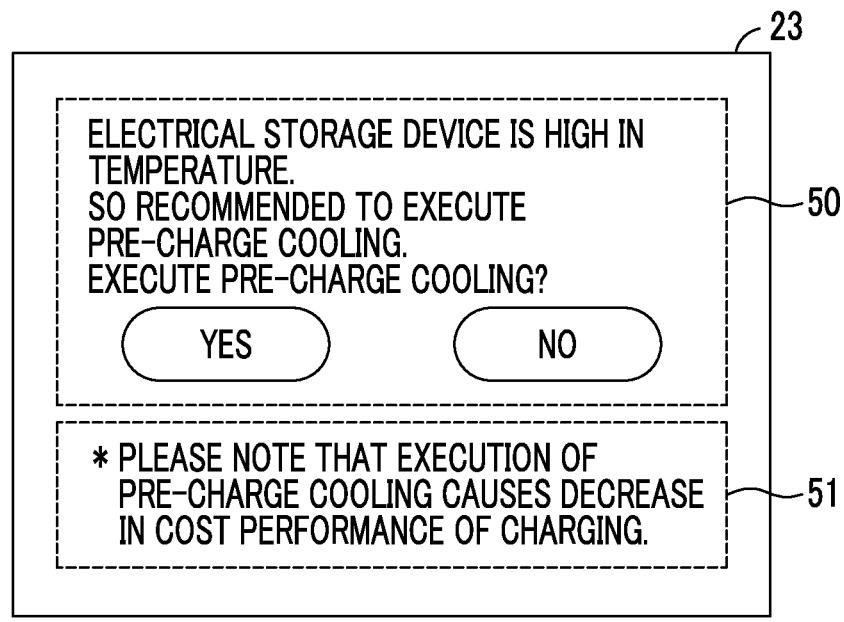
FIG. 15 is a diagram illustrating an example of a screen for selecting whether or not to execute pre-charge cooling, in Embodiment 4.

FIG. 15 is a diagram illustrating an example of a screen for selecting whether or not to execute the pre-charge cooling, in Embodiment 4. Referring to FIG. 15, the screen for selecting whether or not to execute the pre-charge cooling contains messages 50, 51. The message 50 is a message for urging a user to select whether or not to execute the pre-charge cooling, and contains a selection button for the user's selection. The message 51 is a message indicating a decrease in the cost performance of the external charging in a case where the pre-charge cooling has been performed. The messages 50, 51 are contained in the selection screen of the pre-charge cooling, and thus a user can select whether or not to perform the pre-charge cooling after the user has recognized the disadvantage of the pre-charge cooling.

Figure 16:
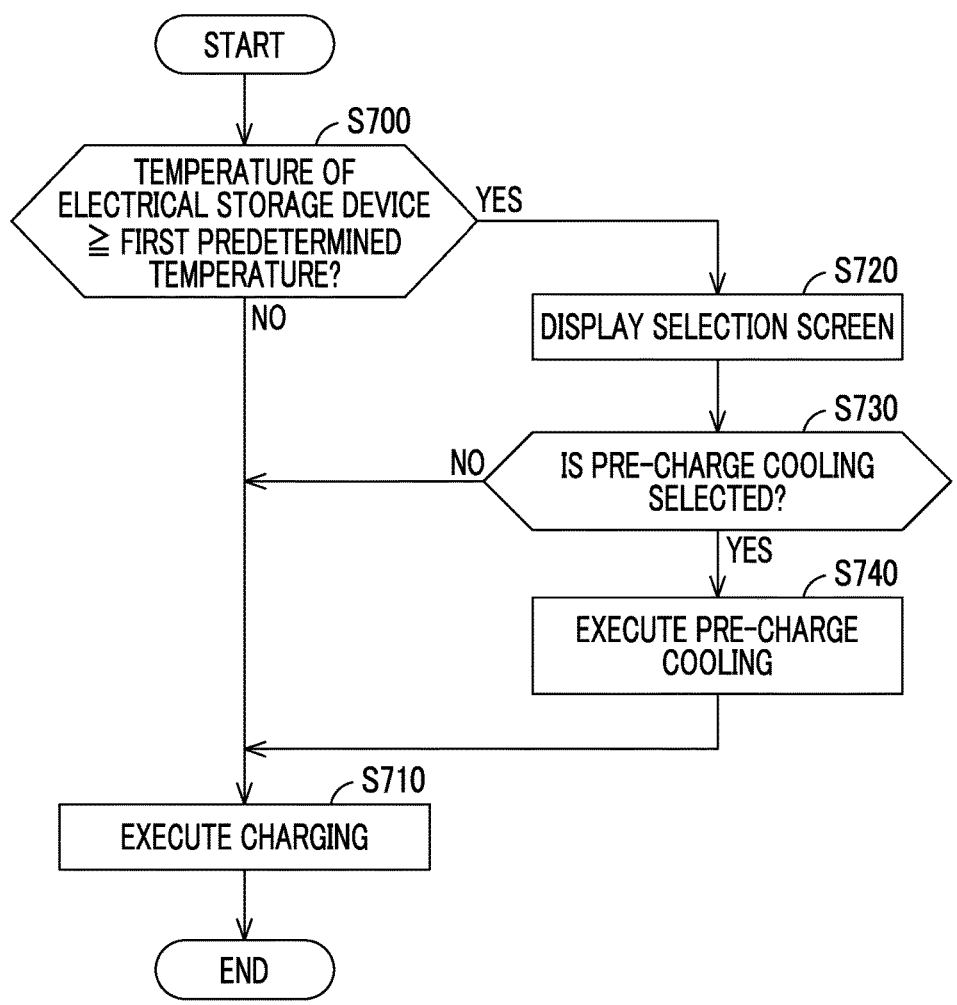
FIG. 16 is a flowchart illustrating a processing procedure of the external charging.

FIG. 16 is a flowchart illustrating a processing procedure of the external charging, in Embodiment 4. Processes shown in the flowchart are executed at a timing when the charging connector 14 is connected to the charging inlet 22.

The ECU 29C determines whether the temperature of the electrical storage device 25 is equal to or higher than the first predetermined temperature by referring to the output of the sensor unit 26 (step S700). In a case where the ECU determines that the temperature of the electrical storage device 25 is less than the first predetermined temperature (NO in step S700), the pre-charge cooling does not need to be performed, and thus the ECU 29C controls the charger 24 so as to execute the external charging (step S710).

In a case where the ECU determines that the temperature of the electrical storage device 25 is equal to or higher than the first predetermined temperature (YES in step S700), the ECU 29C controls the display device 23 so as to display the screen for selecting whether or not to execute the pre-charge cooling (FIG. 15) (step S720). Meanwhile, as described above, the message indicating a decrease in the cost performance of the external charging in a case where the pre-charge cooling has been performed is contained in the screen for selecting whether or not to execute the pre-charge cooling.

Thereafter, the ECU 29C determines whether pre-charge cooling execution (for example, "YES" in FIG. 15) has been selected (step S730). In a case where the ECU determines that pre-charge cooling execution has not been selected (for example, "NO" is selected in FIG. 15) (NO in step S730), the ECU 29C controls the charger 24 so as to execute the external charging (step S710).

On the other hand, in a case where the ECU determines that pre-charge cooling execution has been selected (YES in step S730), the ECU 29C controls the temperature regulation system 28 so as to execute the pre-charge cooling (step S740), and then controls the charger 24 so as to execute the external charging (step S710).

As described above, in the vehicle 20C according to Embodiment 4, the screen for selecting whether or not to execute the pre-charge cooling contains the message (message 51) indicating a decrease in the cost performance of the external charging in a case where the pre-charge cooling has been performed, in addition to the message (message 50) for urging a user to select whether or not to perform the pre-charge cooling. Therefore, with the vehicle 20C, a user can select whether or not to perform the pre-charge cooling after the user has recognized the disadvantage of the pre-charge cooling.

Meanwhile, each of the vehicles 20, 20A, 20B, 20C is an example of a "vehicle" in the disclosure. The display device 23 is an example of a "notifier" in the disclosure. The communication device 21 is an example of a "communication device" in the disclosure. Each of the ECUs 29, 29A, 29B, 29C is an example of an "electronic control unit" in the disclosure. The touch panel provided for the display device 23 is an example of an "input device" in the disclosure. The charger 24 is an example of a "charger" in the disclosure.

Another Embodiment

As described above, Embodiments 1 to 4 have been described. Herein, an example of another embodiment will be described.

In Embodiments 1 to 4, the display device 23 displays a warning screen or the like, and thus a notification to a user has been performed. However, the notification to a user does not necessarily need to be performed using the display device 23. For example, a separate speaker is provided, and thus the notification to a user may be performed using a voice.

In addition, in Embodiments 1 to 3, the information relating to the fee-charging system of the charging stand 10 has been transmitted directly from the charging stand 10 to the vehicle 20 through the communication device 21. However, an acquisition route for the information relating to the fee-charging system is not limited thereto. For example, the information relating to the fee-charging system of each charging stand may be held in a server on the Internet, and the vehicles 20, 20A, 20B may be configured to download the information relating to the fee-charging system of the charging stand 10 through the Internet. In this case, for example, the vehicles 20, 20A, 20B may be configured to transmit global positioning system (GPS) data, obtained from a navigation device or the like (not shown), to the server, and to receive information relating to the fee-charging system of a charging stand present in a position indicated by the GPS data (data indicating a current position of each of the vehicles 20, 20A, 20B), from the server.

In addition, in Embodiments 2, 3, the information relating to the fee-charging system of the charging stand 10 has been received through the communication device 21. However, the information relating to the fee-charging system does not necessarily need to be received through the communication device 21. For example, in a case where data communication can be performed through the charging cable 12, the vehicles 20A, 20B may be configured to receive the information relating to the fee-charging system from the charging stand 10 through the charging cable 12.

In addition, in Embodiment 3, in a case where the cost performance of the external charging is less than the first predetermined value, whether or not to perform the external charging has been automatically determined. For example, in a case where the cost performance of the external charging is less than the first predetermined value, the vehicle 20B may be configured such that a user can set whether or not to perform the external charging being automatically determined. In addition, for example, the Vehicle 20B may be configured such that a user can set at what value (second predetermined value) or greater of the cost performance the external charging is automatically executed.

It should be understood that the embodiments disclosed herein are illustrative and non-restrictive in every respect. The scope of the disclosure is defined by the scope of the claims, rather than the description above, and is intended to include any modifications within the scope and meaning equivalent to the scope of the claims.

What is claimed is:

1. A vehicle configured to receive a supply of power from a charging stand provided outside of the vehicle, the charging stand being configured to perform fee-charging on the supply of power to the vehicle in accordance with a fee-charging system based on a use time of the charging stand, the vehicle comprising:
   an electrical storage device configured to perform external charging using the power supplied from the charging stand;
   a notifier configured to execute a notification to a user;
   a communication device configured to acquire information relating to the fee-charging system of the charging stand; and
   an electronic control unit configured to:
      predict an amount of charging power of the electrical storage device and the use time in a case where the external charging is performed, in accordance with a state of the electrical storage device,
predict cost performance of the external charging based on a ratio of the predicted amount of charging power to the predicted use time, and the information relating to the fee-charging system, and
control the notifier so as to execute the notification of the cost performance.

2. The vehicle according to claim 1, further comprising an input device configured to receive input from the user,
wherein the notifier is configured to urge the user to select whether or not to execute the external charging through the input device.

* * * * *

UNITED STATES PATENT AND TRADEMARK OFFICE
CERTIFICATE OF CORRECTION

PATENT NO. : 10,363,827 B2
APPLICATION NO. : 16/146711
DATED : July 30, 2019
INVENTOR(S) : Shigeki Kinomura Page 1 of 1

It is certified that error appears in the above-identified patent and that said Letters Patent is hereby corrected as shown below:

In the Specification

In Column 3, Line 39, after "that", delete ",".

In Column 9, Line 32, after "Relating", delete ",".

In Column 12, Line 43, delete "winch" and insert --which--, therefor.

In Column 13, Line 15, after "external", delete ",".

In Column 16, Line 22, delete "pit-charge" and insert --pre-charge--, therefor.

Signed and Sealed this
Twenty-fourth Day of September, 2019

Andrei Iancu
*Director of the United States Patent and Trademark Office*